United States Patent [19]

Wong

[11] Patent Number: 5,327,582
[45] Date of Patent: Jul. 5, 1994

[54] WIDEBAND WIRELESS COMMUNICATIONS RECEIVER

[75] Inventor: Donald H. Wong, Vancouver, Canada

[73] Assignee: Motorola, Inc., Schaumburg, Ill.

[21] Appl. No.: 825,370

[22] Filed: Jan. 24, 1992

[51] Int. Cl.$^5$ .............................................. H04B 1/40
[52] U.S. Cl. ...................................... 455/76; 455/77; 455/87; 455/183.2; 455/196.1; 455/260; 455/265; 455/319; 331/48
[58] Field of Search ................. 455/76, 77, 86–87, 455/183.1, 183.2, 188.1, 196.1, 258, 260, 265, 318, 319; 331/46, 48

[56] References Cited

U.S. PATENT DOCUMENTS

| | | |
|---|---|---|
| 2,637,808 | 5/1953 | Herrick ........................... 455/188.1 |
| 4,061,973 | 12/1977 | Reimers et al. ...................... 455/76 |
| 4,543,661 | 9/1985 | Defevilly et al. ..................... 455/76 |
| 4,704,735 | 11/1987 | Swapp et al. ......................... 455/77 |
| 4,802,235 | 1/1989 | Treatch ............................... 455/76 |
| 4,961,074 | 10/1990 | Martinson .......................... 455/319 |
| 5,123,008 | 6/1992 | Beesley ............................... 455/86 |
| 5,175,872 | 12/1992 | Borras ................................ 455/76 |

Primary Examiner—Reinhard J. Eisenzopf
Assistant Examiner—Andrew Faile
Attorney, Agent, or Firm—Charles W. Bethards

[57] ABSTRACT

A wideband transceiver using contiguous overlapping frequency range local oscillators (32, 34) for a high side or a low side local oscillator and an intermediate frequency approaching, within commercialy practical limits, but not exceeding one half of the total limited oscillator frequency range (71).

9 Claims, 1 Drawing Sheet 5,327,582

WIDEBAND WIRELESS COMMUNICATIONS RECEIVER

BACKGROUND OF THE INVENTION

This invention relates to wireless communications transceivers, including but not limited to, transceivers adapted for multipurpose operations over a broad range of frequencies.

Globalization of the wireless communications market has resulted in a growing number of sophisticated users whose requirement for economically effective voice and/or data services can span multiple countries and continents. This requirement generates competitive pressure to provide equipment with the requisite flexibility and capability to operate within, and meet the regulatory mandates of, multiple jurisdictions.

Among numerous attributes, this equipment may need to operate over a large radio frequency bandwidth (for example 400 MHz-500 Mhz) without significant performance loss or otherwise becoming physically, economically, or functionally unacceptable. One significant constraint on this range may be the bandwidth or range of frequencies over which a voltage controlled oscillator, acting as a local oscillator, can deliver acceptable performance.

One known transceiver architecture that is used includes two voltage controlled oscillators, each capable of supplying a limited range of oscillator frequencies, operating on adjacent ranges of frequencies and collectively supplying either high side or low side local oscillator frequencies ($f_{LO}$) to a receiver. The $f_{LO}$ is such that the difference between a desired receive frequency and the $f_{LO}$ is equivalent to an intermediate frequency ($f_{IF}$). The $f_{IF}$ is preselected in view of commercial practicality and largely without regard to the magnitude of the range of oscillator frequencies. If, as is typical, a transmitter needs to cover the same range of frequencies as the receiver, one or more, in effect additional, voltage controlled oscillators may be required to supply these local oscillator frequencies. Other things being equal, physical size, economic cost, and power consumption may increase as the range of frequencies increase (number of voltage controlled oscillators increase).

Clearly a need exists for a transceiver that operates over a large range of radio frequencies without incurring the burdens associated with additional voltage controlled oscillators.

SUMMARY OF THE INVENTION

This invention addresses the aforementioned needs by providing a wireless communications receiver that is arranged and constructed for receiving radio signals throughout a range of frequencies formed by overlapping predetermined high-side and low-side frequency bands. The invention receives the radio signals to provide a radio signal at a desired receive frequency and generates a local oscillator signal frequency that, is greater than the desired frequency when the desired frequency satisfies a first threshold frequency, is less than the desired frequency when the desired frequency satisfies a second threshold frequency, but in either event is within a total limited oscillator frequency range. The radio signal and the generated local oscillator signal frequency are then mixed to produce a signal at an intermediate frequency that corresponds to a magnitude of a frequency difference between the desired receive frequency and the local oscillator signal frequency, and is less than one half of the total limited oscillator frequency range.

BRIEF DESCRIPTION OF THE DRAWINGS

The features of the present invention which are believed to be novel are set forth with particularity in the appended claims. The invention, itself, however together with further advantages thereof, may best be understood by reference to the accompanying drawings in which:

DETAILED DESCRIPTION

Figure 1:
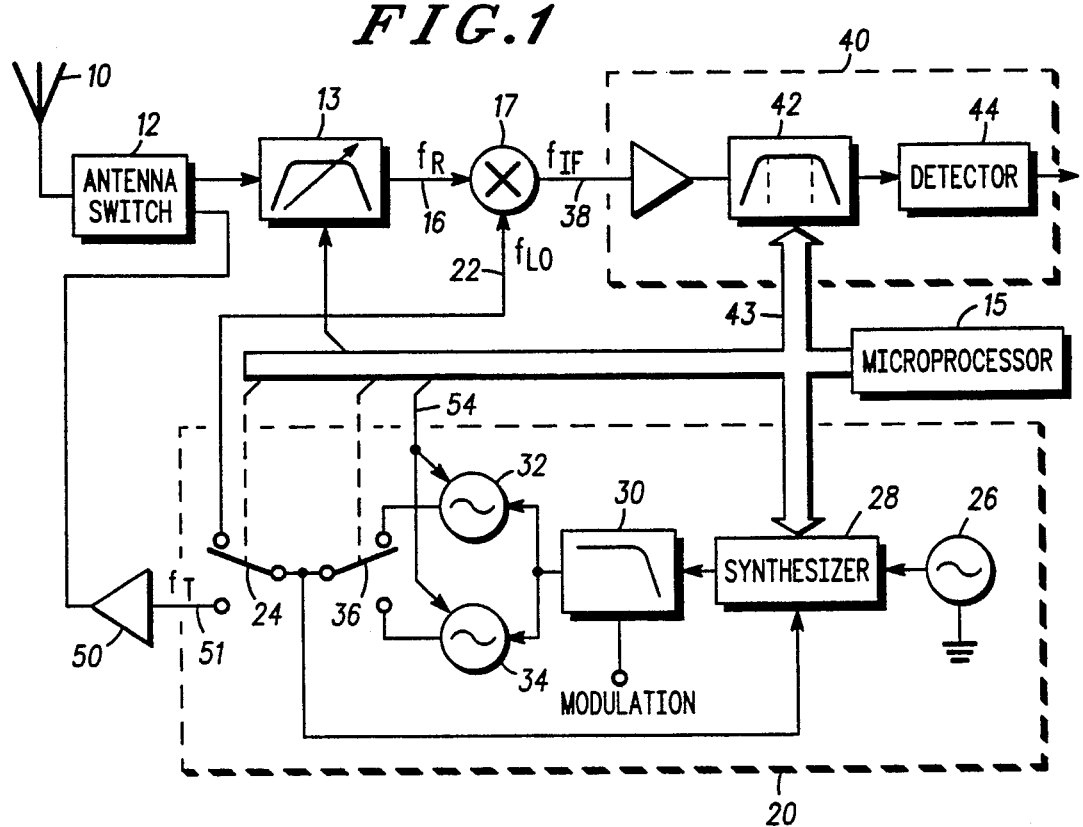
FIG. 1 is a circuit and block diagram of a wireless communications transceiver in accordance with one embodiment of the present invention.

Referring to FIG. 1, antenna (10) couples, by way of antenna switch (12), radio signals within a range of frequencies, for example 400 to 500 MHz, to a tunable filter (13). The tunable filter (13), controlled by processor (15), couples a subset, for example 5 MHz, of this range of frequencies, including a radio signal at a desired receive frequency ($f_R$) (16), to mixer circuit (17) and rejects other potential interfering radio signals, for example certain spurious signals with a predetermined frequency relationship to $f_R$ (16).

Oscillator circuitry (20), under control of the processor (15), generates a local oscillator signal frequency ($f_{LO}$) (22) that is coupled to the mixer circuit (17) by R/T switch (24). The oscillator circuitry (20) operates in a frequency synthesizer fashion and includes a high stability reference oscillator (26), programmable integrated circuit (28), loop filter (30), first voltage controlled oscillator (VCO) (32), second VCO (34), and a VCO switch (36).

The mixer circuit (17) combines $f_R$ (16) and $f_{LO}$ (22) and produces a signal at an intermediate frequency ($f_{IF}$) (38). This signal is such that $f_{IF}$ (38) equals the magnitude of the frequency difference between $f_R$ (16) and $f_{LO}$ (22) ($|f_R - f_{LO}|$). The $f_{IF}$ (38) is coupled to IF/detector circuitry (40) where a variable bandwidth IF filter (42), controlled by the processor (15) at input (43), selectively couples (substantially rejects all other signals) $f_{IF}$ (38) with it's associated information and bandwidth to detector (44) where the information is demodulated.

FIG. 1 is also demonstrative of the instant invention operating in a transmit mode. Under control of the processor (15) R/T switch (24) is actuated and the oscillator circuitry is coupled to transmitter (50). The transmitter (50) amplifies a local oscillator signal at a desired transmit frequency ($f_T$) (51) and applies the amplified signal to antenna (10) by way of antenna switch (12).

Figure 2:
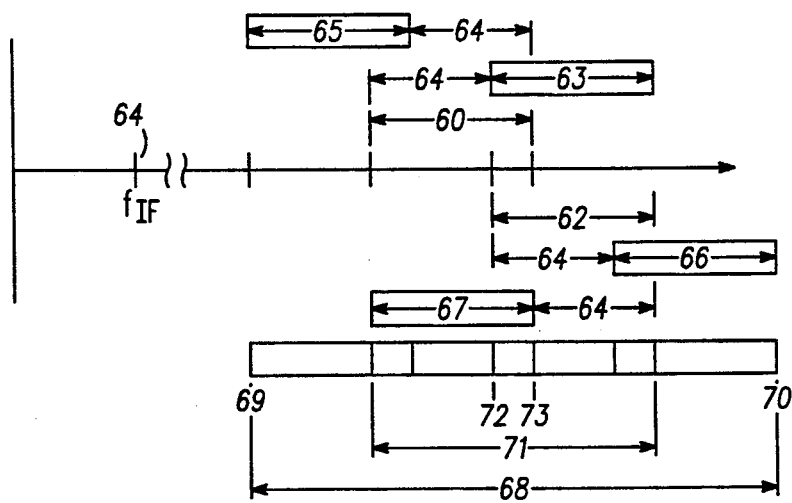
FIG. 2 is a graphic illustration regarding the frequency ranges and relationships associated with the transceiver of FIG. 1.

The instant invention will be further appreciated by referring to the various frequency relationships depicted in FIG. 2 together with the FIG. 1 description above and the need to maximize a contiguous range of frequencies that can be received. The first VCO (32) and the second VCO (34) are each respectively capable of generating a limited range of oscillator frequencies (60, 62), for example 70 MHz at a nominal operating frequency of 450 MHz, at an acceptable performance level (e.g. sufficient sideband noise ratio).

The first VCO (32) may be used as $f_{LO}$ for a first higher band of frequencies (63) equivalent to its range of oscillator frequencies (60) and higher in frequency by $f_{IF}$ (64). Similarly the first VCO (32) may be used as $f_{LO}$ for a first lower band of frequencies (65) equivalent to its range of oscillator frequencies (60) and lower in frequency by $f_{IF}$ (64). The second VCO (34) may be used as $f_{LO}$ for a second higher band of frequencies (66) equivalent to its range of oscillator frequencies (62) and higher in frequency by $f_{IF}$ (64). Similarly the second VCO (34) may be used as $f_{LO}$ for a second lower band of frequencies (67) equivalent to its range of oscillator frequencies (62) and lower in frequency by $f_{IF}$ (64). With the VCO's (32, 34) ranges of oscillator frequencies (60, 62) and the $f_{IF}$ (64) selected as depicted in FIG. 2 a contiguous range of frequencies (68) extending from a lower frequency (69) to a higher frequency (70) may be received by the FIG. 1 embodiment while the VCOs (32, 34) collectively operate over a total limited oscillator frequency range (71).

Moreover, when the $f_R$ (16) is less than a first threshold frequency (72), the corresponding $f_{LO}$ (22) will be greater than $f_R$ (16) and conversely when the $f_R$ (16) is greater than a second threshold frequency (73) such $f_{LO}$ (22) will be less than $f_R$ (16). Throughout the frequencies from the first threshold frequency (72) to the second threshold frequency (73) the $f_{LO}$ may be either less than or greater than $f_R$ (16). Therefore the contiguous range of frequencies (68) is comprised of an overlapping highside frequency band including the $f_{RS}$ above the first threshold frequency (72) and an overlapping lowside frequency band including the $f_{RS}$ below the second threshold frequency (73). These overlapping frequency bands are predetermined and necessitated by practical design considerations of repeatability and the oscillator circuitry (20) stability in environmental extremes.

Still another consideration should be kept in mind regarding the selection of $f_{IF}$ (64). Practical considerations such as physical size, commercial availability and cost may provide a lower bound on $f_{IF}$ (64). But in any event, for contiguous and slightly overlapping limited ranges of oscillator frequencies (60, 62), arrayed, constructed, and operated per the instant invention, the range of frequencies (68) within which $f_R$ (16) is allowed may be optimized or maximized by selecting $f_{IF}$ (64) equal to one half of the total limited oscillator frequency range (71). Commercial practicality or other design considerations, such as the required range of frequencies or spurious interfering signals, may necessitate a selection of the $f_{IF}$ (64) which only approaches this optimum upper boundary.

In the transmit mode, processor (15) may control the total limited oscillator frequency range (71) using control input (54) to lower the performance level (decrease the VCO sideband noise ratio) of the first and second VCO (32, 34). Normally a transceiver in the transmit mode can trade the lower performance level for an increase in limited oscillator frequency range and thus generate those $f_{TS}$ (51) that may otherwise fall outside the total limited oscillator frequency range (71).

What is claimed is:

1. A wireless communications receiver having the capability of receiving radio signals throughout a contiguous range of frequencies formed by overlapping predetermined high-side and low-side frequency bands, comprising:
   a) input means for receiving the radio signals to provide a radio signal at a desired receive frequency;
   b) oscillator means for generating a local oscillator signal frequency that
      i) is greater than said desired frequency when said desired frequency is less than a first threshold frequency, and
      ii) is less than said desired frequency when said desired frequency is greater than a second threshold frequency wherein said second threshold frequency is greater than said first threshold frequency, and
      iii) is within a total limited oscillator frequency range; and
   c) mixer means, responsive to said input means and said oscillator means, for producing a signal at a selected intermediate frequency that
      i) corresponds to a magnitude of a frequency difference between said desired frequency and said local oscillator signal frequency, and
      ii) is less than one half of said total limited oscillator frequency range.

2. A wireless communications receiver in accordance with claim 1 wherein the input means includes at least a first filter means for rejecting radio signals with a predetermined frequency relationship to said radio signal.

3. A wireless communications receiver in accordance with claim 2 further including detector means, responsive to said mixer means, for demodulating information associated with said signal at an intermediate frequency.

4. A wireless communications receiver in accordance with claim 3 wherein said detector means further includes a second filter means, having a variable bandwidth, for coupling said signal at an intermediate frequency and its associated bandwidth to a detector.

5. A wireless communications transceiver having the capability of transmitting and receiving radio signals throughout a range of frequencies including overlapping predetermined high-side and low-side frequency bands, comprising:
   a) input means for receiving the radio signals to provide a radio signal at a desired receive frequency;
   b) oscillator means for generating a local oscillator signal frequency that
      i) is greater than said desired frequency when said desired frequency is less than a first threshold frequency, and
      ii) is less than said desired frequency when said desired frequency is greater than a second threshold frequency wherein said second threshold frequency is greater than said first threshold frequency, and
      iii) is within a total limited oscillator frequency range; and
   c) mixer means, responsive to said input means and said oscillator means, for producing a signal at a selected intermediate frequency that
      i) corresponds to a magnitude of a frequency difference between said desired receive frequency and said local oscillator signal frequency, and
      ii) is less than one half of said total limited oscillator frequency range; and
   d) transmitter means, responsive to said oscillator means, for transmitting a radio signal at a desired transmit frequency within the range of frequencies.

6. A wireless communications transceiver in accordance with claim 5 wherein the input means includes at least a first filter means for rejecting radio signals with a predetermined frequency relationship to said radio signal.

7. A wireless communications transceiver in accordance with claim 6 further including detector means, responsive to said mixer means, for demodulating information associated with said signal at an intermediate frequency.

8. A wireless communications transceiver in accordance with claim 7 wherein said detector means further includes a second filter means, having a variable bandwidth, for coupling said signal at an intermediate frequency and its associated bandwidth to a detector.

9. A wireless communications transceiver in accordance with claim 5 wherein said oscillator means further includes control means for adjusting said total limited oscillator frequency range such that said radio signal at a desired transmit frequency will at least coincide with said range of frequencies.

* * * * *